Jan. 19, 1937.  C. C. KASKELL  2,068,272
COMPOSITE RECORDER
Original Filed Aug. 5, 1933   3 Sheets-Sheet 1
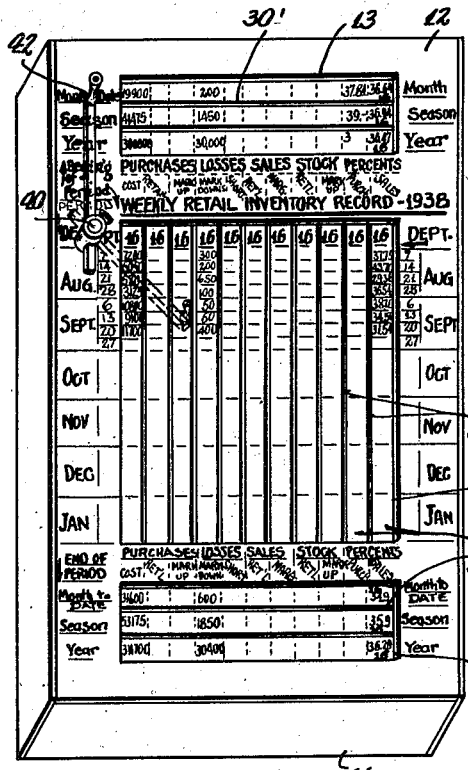
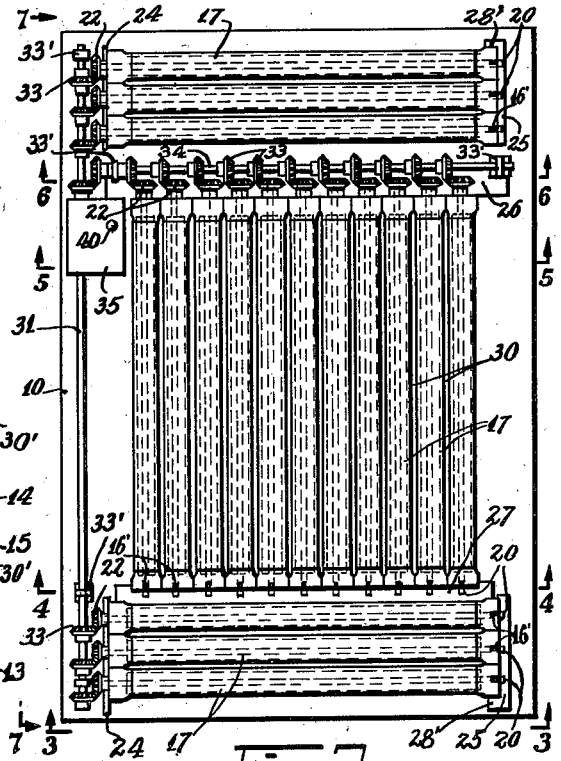
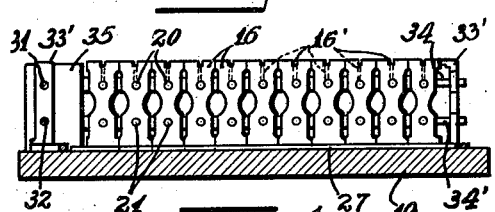
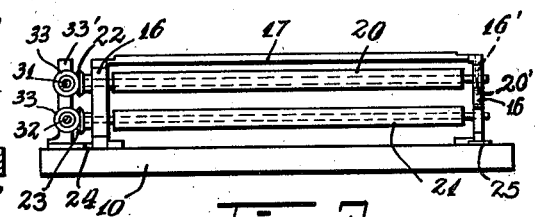
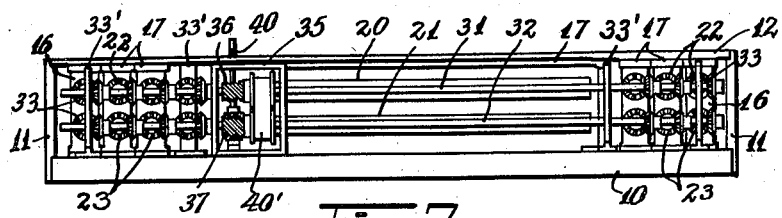
INVENTOR
CHESTER C. KASKELL
BY Zoltan N. Polachek
ATTORNEY

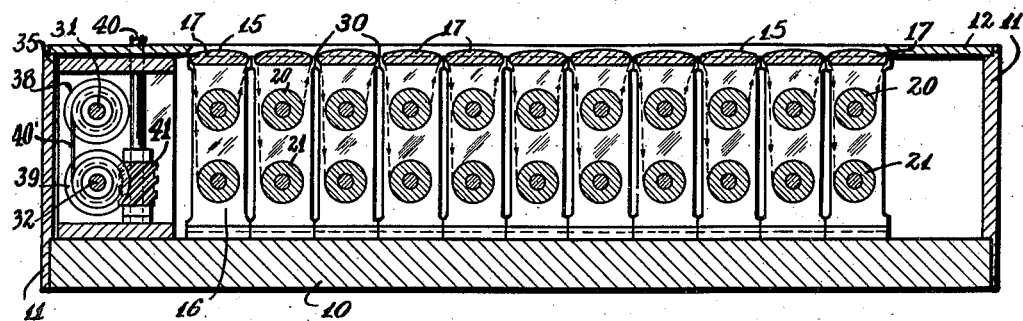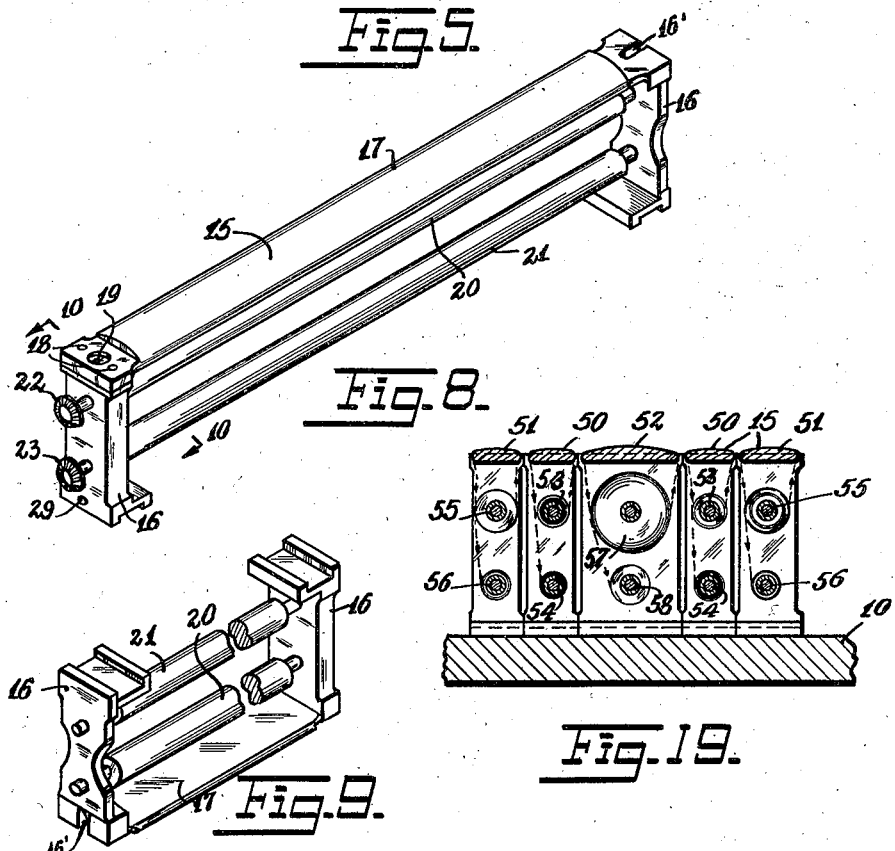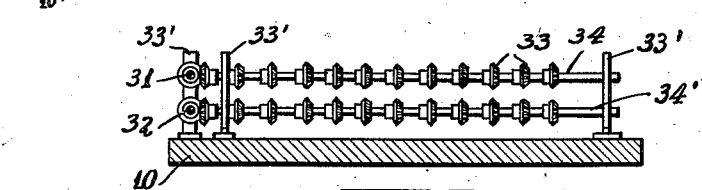

Jan. 19, 1937. C. C. KASKELL 2,068,272
COMPOSITE RECORDER
Original Filed Aug. 5, 1933 3 Sheets—Sheet 3
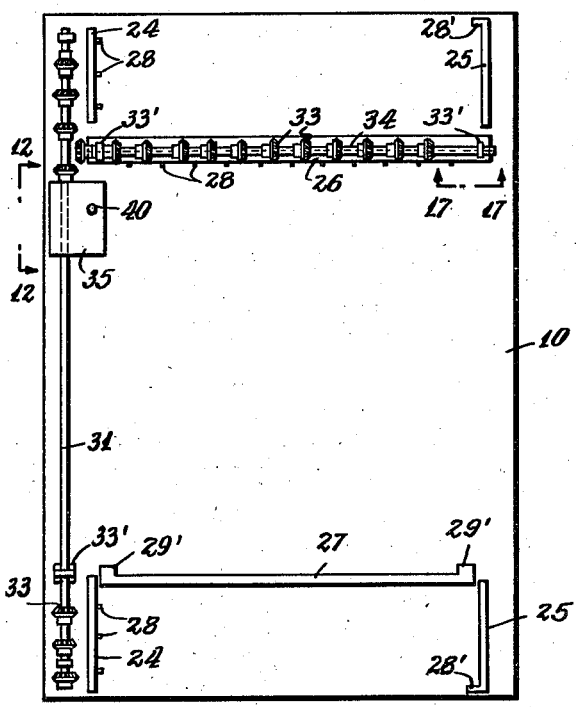
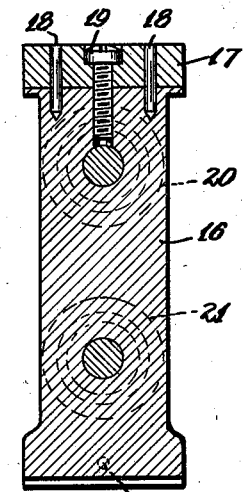
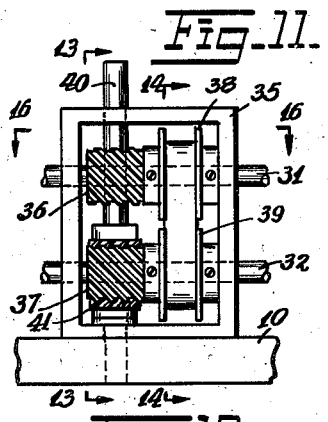
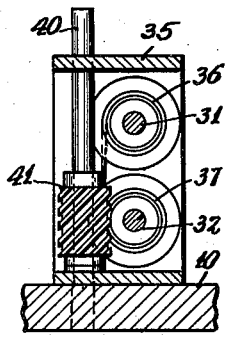
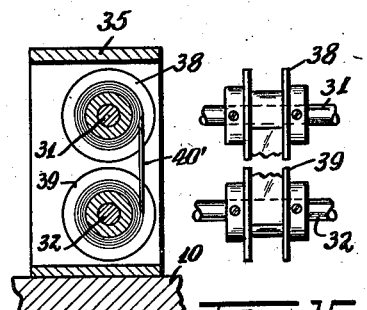
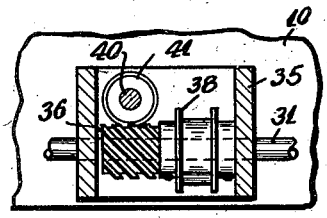
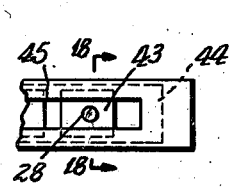
INVENTOR
CHESTER C. KASKELL
BY
ATTORNEY Patented Jan. 19, 1937

2,068,272

UNITED STATES PATENT OFFICE 2,068,272

COMPOSITE RECORDER

Chester C. Kaskell, St. Paul, Minn.

Application August 5, 1933, Serial No. 683,738
Renewed November 12, 1935

15 Claims. (Cl. 281—8)

This invention relates to new and useful improvements in a device for forming composite sheet-like pages as a means for overcoming the lack of flexibility of the conventional methods for recording modern business information. Particularly the invention relates to a device arranged for synchronized columnar recording.

The present invention relates in part to subject matter of an abandoned application I filed on June 28, 1932, Serial No. 619,621.

The invention may best be understood by first understanding that recording in modern business methods includes the arrangement of numerous columns upon a page and numerous pages with such columns. The disadvantage of arranging columns upon pages lies in the fact that in order to duplicate another column or columns from one page to another page it is necessary that the columns be rewritten. The duplication of columns or lines upon different pages occurs repeatedly in different types of bookkeeping systems especially in the double and triple entry systems.

The invention has for an object the arrangement of a likeness to a page composed of removable and interchangeable columns. This arrangement has the advantage of great flexibility in that a column or columns may be substituted or interchanged without the necessity of rewriting the entire record.

If a conventional page with columns is cut into slices these slices are readily interchangeable. If the records involve only one page then it would be practical to cut the page in columns for the purpose of interchanging. It so happens that business records are very voluminous and if all the pages of a record book were sliced into columns, there would be greater flexibility in that the columns may be interchanged, etc., but unfortunately other difficulties arise such as the proper handling of the flimsy columns and the necessity of assorting, filing and other problems which greatly outweigh any advantages gained by the flexibility of interchanging.

Another advantage of my arrangement of a device for forming composite pages and composite books lies in the fact that one section may be prepared in final form at an original or remote source instead of first being prepared on a preliminary sheet and then transferred to the pages and books.

It is an object of this invention to so arrange the device for forming composite pages and books that the columns or lines of said pages and books may be prepared at an original or remote source which will eliminate the necessity of first preparing a preliminary sheet and thereafter recopy the data. To better explain the arrangement assume that a milkman delivering milk along his route, records his records upon one of the web units or columns to be used in the composite pages and books. At the end of the day or at any other convenient times the milkman merely hands in his record and this record may be slipped into the device for forming the composite pages and composite books and operates as the record itself without the necessity of reentering it upon pages and books.

Still further the invention proposes an arrangement whereby a plurality of web units adapted to expose sections of webs matched for synchronization are associated with a body and means whereby the web units are readily removable, interchangeable and replaceable, and an arrangement for moving the webs in synchronism with each other to and fro to produce the effect of composite sheets, pages and books.

Still further it is proposed to so arrange the web units that the exposed sections are substantially on a horizontal plane simulating a page, or the page of a book.

Furthermore an arrangement is proposed whereby certain of the exposed web portions are parallel to each other and other web portions at right angles to said portions so as to produce the effect of columns and lines upon the pages.

Still further the invention proposes to adapt the device in a manner so that it may be turned with any side at the bottom to produce the effect of vertical columns or horizontal lines depending upon one's desires.

As another object of this invention it is proposed to provide an arrangement in a device as mentioned wherein the web units when engaged in place simultaneously engage or connect with the synchronized system, and wherein the web units are readily removable.

Still further the invention proposes an arrangement whereby a single control handle is adapted to cause the synchronized web units to be operated so that the webs move to and fro in perfect synchronization.

Still further the invention contemplates constructing each of the web units with matched pair of rollers upon which the web is engaged and arranging a writing surface across which the web extends and supporting the portions exposed.

Still further the invention proposes to arrange the webs of the web units so that the webs may be composed of several layers equivalent to overlapping composite sheets whereby original and carbon copies may be made at one time.

Furthermore as another object of this invention it is proposed to adapt the device so that several sectional webs may be arranged edge to edge so as to set up required columns of great width actually formed by webs which are of small width but whose total comprises said width.

Furthermore as another object of this invention it is proposed to so arrange the device that it is adapted to be manually operated or power driven.

As another object of this invention it is proposed to provide an arrangement whereby the webs may be suitably formed with lines while in place.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a device constructed according to this invention.

Fig. 2 is a plan view of Fig. 1 illustrated with the upper portion of the body removed.

Fig. 3 is an edge elevational view of Fig. 2 looking in the direction of the line 3—3 of Fig. 2.

Fig. 4 is a sectional view taken on the line 4—4 of Fig. 2.

Fig. 5 is a sectional view taken on the line 5—5 of Fig. 2.

Fig. 6 is a sectional view taken on the line 6—6 of Fig. 2.

Fig. 7 is a side elevational view looking in the direction of the line 7—7 of Fig. 2 with one side wall removed.

Fig. 8 is a perspective view of one of the writing units per se showing when the unit is removed from the device.

Fig. 9 is a fragmentary perspective view of the unit shown in Fig. 8 but illustrated upside down.

Fig. 10 is an enlarged sectional view taken on the line 10—10 of Fig. 8.

Fig. 11 is a plan view similar to Fig. 2 but illustrating all of the writing units removed.

Fig. 12 is a fragmentary side elevational view looking in the direction of the line 12—12 of Fig. 11.

Fig. 13 is a sectional view taken on the line 13—13 of Fig. 12.

Fig. 14 is a sectional view taken on the line 14—14 of Fig. 12.

Fig. 15 is a fragmentary elevational view of a portion of Fig. 14 illustrating the rollers with the web at the bottom.

Fig. 16 is a horizontal fragmentary sectional view taken on the line 16—16 of Fig. 12.

Fig. 17 is a fragmentary detailed view of a portion of Fig. 11 seen as though looking in the direction of the line 17—17 of Fig. 11.

Fig. 18 is a sectional view being taken on the line 18—18 of Fig. 17.

Fig. 19 is a view similar to Fig. 5 but illustrating a modified arrangement of the invention.

The device according to this invention comprises a body consisting of a base board 10, a wall structure 11 adapted to engage upon the base board 10 and a top plate 12 adapted to engage upon the wall section 11. The wall section 11 comprises several vertical walls of the same lengths as the sides of the base board and opened at the top and bottom. The top board 12 is formed with several window openings 13 and 14 through which the web units may be viewed as hereinafter described.

A plurality of web units are adapted to expose sections of web 15 matched for synchronization, and each unit comprising side brackets 16 and a connecting element 17. The element 17 is engaged across the upper ends of the side brackets 16. Dowel pins 18 are mounted upon the ends of the elements 17 and engaged in corresponding openings in the upper portions of the end brackets 16 for the purpose of perfectly aligning the parts. Screws 19 serve to removably attach the element 17 upon the end brackets 16.

Each of the web units also comprises an upper roller 20 and a lower roller 21 matched as to size. These rollers are rotatably mounted in the end brackets 16. Miter gears 22 and 23 are respectively mounted upon one of the ends of the rollers 20 and 21. These miter gears are located outside of the brackets 16. The outer face of the element 17 is convexed as clearly illustrated in Fig. 5 and constitutes the writing surface for the web 15 and engages thereover. The web 15 is wound upon the rollers 20 and 21 and the different webs 15 of the different units are matched as to the amount of winding on each of the rollers.

A means is provided associated with the body of the device and with the web units for readily removably holding said web units upon the body. This means comprises opposed strips 24 and 25, and other opposed strips 26 and 27. The opposed strips 24 and 26 are provided with projecting pins 28 adapted to engage in openings 29 formed in one of the brackets 16 of each web unit. As illustrated on the drawings, each web unit is provided with one opening 29 adapted to engage one of the pegs 28. The arrangement is such that the web units may be mounted between the strips 24 and 25 and the strips 26 and 27, by merely engaging them in place. More particularly first the bracket ends 16 provided with the openings 29 should be placed so that the pegs 28 engage into the openings 29 and then the other bracket 16 moved downwards so as to sit upon the inner side of opposed strip, the strip 25 or the strip 27 depending upon the location of the web units.

The strips 25 are provided with offset ends 28' for the purpose of better holding the web units. Similarly, the strip 27 is provided with offset ends 29' for the same purpose. The strips 24, 25, 26 and 27 are permanently attached upon the base board 10. In Fig. 2 a base board 10 is shown with a full set of the writing units in place. It should be noticed that the center web units are arranged vertically so as to simulate columns while the top and bottom web units are arranged horizontally to simulate lines. These writing units are exposed through the openings 13 and 14 as clearly illustrated in Fig. 1.

The top plate 12 of the body is inscribed with certain data according to the data upon the webs of the writing units. In Fig. 1 such data is shown to comprise dates, quantities and other information. The exact arrangement of this information, illustrated on the drawings, is not important since the arrangement merely depends upon the data being collected. In different bookkeeping systems the data will be different, and for different purposes different data will be arranged. The important feature of the arrangement resides in the fact that certain of the writing units are arranged parallel and adjacent to each other to form vertical columns of the page while other of the writing units are arranged parallel and horizontal to form lines on the page. The data upon the top plate 12 must be fixed data in relation to the variable data on the webs.

Examining Figs. 2, 8 and 9 in detail it should be noticed that the widths of the writing surfaces of the top pieces 17 are smaller than the end brackets 16. This arrangement provides spaces 30 between the writing units through which the web may pass. At times the exposing of such space may be undesirable and for this reason covering strips 30' are extended across the windows 13 and 14 so as to cover these spaces.

A means is associated with the body of the device and with the web units for moving the webs to and fro in synchronization. This means comprises shafts 31 and 32 rotatively mounted in standards 33' fixed upon the base board 10. The shafts 31 and 32 are superimposed and upon the same horizontal altitudes as the rollers 20 and 21 of the units. These shafts are provided with miter gears 33 adapted to mesh with the miter gears 22 and 23 of the web units. More particularly the arrangement is such that the miter gears 22 mesh with the miter gears 33 upon the shaft 31 and the miter gears 23 mesh with the miter gears 33 upon the shaft 32.

Other shafts 34 and 34' are rotatively mounted in standards 33' also fixed upon the base board 10. These shafts 34 and 34' are arranged at right angles to the shafts 31 and 32 and upon the same elevations. Furthermore the shafts 34 and 34' are arranged with miter gears 33 adapted to mesh with the miter gears 23 and 22 of the web units arranged at right angles to the before mentioned web units. More particularly the arrangement is such that when the shaft 31 or 32 is rotated this rotation will be transmitted to simultaneously rotate the opposite drive shaft and both of the rollers of each of the writing units so as to cause the web to travel between the rollers of the writing units.

If for example the shaft 31 is rotated anti-clockwise, see Fig. 5, the webs 15 of all of the writing units will simultaneously and in synchronization move in one direction and should the shaft 32 be rotated in the opposite direction, then all of the webs will move simultaneously and in synchronization in the opposite direction.

A means is provided for rotating the shafts 31 and 32 as desired. This means comprises a support in the form of a frame 35 attached upon the base board 10. The shafts 31 and 32 pass through the sides of this frame. Mounted upon the shafts and within the frame there are gears 36 and 37 respectively upon the shafts 31 and 32. Furthermore drums 38 and 39 are also mounted upon the shafts 31 and 32 respectively and within the frame 35. A tape 40' is mounted upon the drums 38 and 39 to transmit the rotation from one drum to another and is included in the means for causing the web units to work in synchronization. A vertical shaft 40 is slidably mounted in the frame 35. A gear 41 is secured on shaft 40 which if rotated in one direction, will rotate the gear 37. If it is rotated in the other direction and allowed to rise it will move up and assume a neutral position between the gears 36 and 37. If it is forced upwards slightly more so that its teeth engage with the teeth of the gear 36 it will then move up completely and further rotation of the shaft 40 will cause the gear 36 to rotate.

The shaft 40 extends through an opening in the top plate 12. A handle 42 is detachably mounted upon the extending end of the shaft 40.

The pins 28 are adjustably mounted so as to readily permit the web units to be mounted and removed from place. More particularly each of the pins 28 project from an individual plate 43 slidably within a recess 44 in the supporting strips, that is, the strips 24 or 26 as the case may be. The recess 44 is formed by constructing the strips 24 or 26 of two sections of material secured together and one of the sections being formed with a recess. The pegs 28 project from slots 45. The plates 43 maintain their position frictionally. The arrangement is such that each of the pins 28 may be moved upwards, downwards or sideways through small distances as allowed by the plate 43.

In Fig. 19 another embodiment of the invention has been disclosed which is substantially identical to the previous form differing only in the proportion of the parts. More particularly the web units are arranged of different widths. The fundamental idea of synchronization is maintained. As shown in Fig. 19 there are several web units 50 of a small width, other web units 51 of a larger width and still other web units 52 of a still larger width. Each of these web units are constructed substantially identical to those previously described except for the constructions of the rollers. The web units 50 are provided with matched upper and lower rollers 53 and 54 of a small size. The web units are provided with matched upper and lower rollers 55 and 56 of a larger size than the rollers 53 and 54 and the large web units 52 are provided with still larger matched upper and lower rollers 57 and 58. All of these rollers must be so related in size that the writing units work in synchronization.

It should be borne in mind that all of the rollers 53–58 inclusive turn simultaneously and through the same angular distances. When one roller turns one rotation the other turns correspondingly because of the driving system. The rollers of each of these web units are provided with miter gears of the same size adapted to mesh with similar miter gears of the driving mechanism, the last mentioned miter gears corresponding with the gears 33 described in the previous form. The object of making the rollers of matched different sizes is to cause synchronized motion of the webs. For example, when the webs of the units 50 are moved off to the next web sections there will be a similar simultaneous action upon the webs of the units 51 and the units 52. This arrangement provides for exposing complete columns at each time irrespective of the widths of the web units.

The operation of the device will be understood by the following: The handle 42 should be turned in one direction, for example, clockwise to transmit rotation to the shaft 40, gear 41, the gear 37 and the shafts 32 and 34'. This will transmit rotation to drive shafts 31 and 34 through the tape 40' and will cause all of the rollers to be driven so as to cause the rollers of each of the web units to turn and simultaneously move the webs. All of the web units must be matched up with each other, that is, they must be just the same number of turns on all of the upper rollers, and on the lower rollers. This matched up system is also synchronized with the tape 40' so that the upper rollers leave off as much as the lower rollers take up.

If after turning the handle 42 the new positions of the webs have been obtained, and the handle 42 happens to extend partially across some of the writing units as for example indicated by the dot and dash lines in Fig. 1, then the handle may be turned anti-clockwise and the gears 41 and 37 will disengage. The shaft 40 may then idle to a satisfactory position, as for example, position shown in full lines in Fig. 1. To cause the webs to move backwards it is necessary that the handle 42 be rotated anti-clockwise first to cause the gears 41 and 37 to disengage, and then cause the gear 41 to engage with the gear 36. Further rotation will transmit rotation to the upper rollers of each of the writing units and through tape 40' to the lower rollers.

If it is desired to interchange the writing units or remove certain of the writing units and replace them with others or totally remove some of the writing units it is necessary that the top board 12 be removed. This top board 12 can be lifted off since it maintains its position frictionally. When lifting it off, all of the web units are exposed and then any one or more of the web units may be removed by first lifting up the end which is free and then sliding off the end which engages upon the peg 28.

Each writing unit may be locked against rotation by a pin, inserted through hole 16' on the top of bracket 16 where the pin engages a hole 20' in one end of roller shaft 20.

The effect of the device is the formation of a composite page and a composite book. In Fig. 1 one particular composite page has been illustrated. By removing or interchanging the web units, the columns may be interchanged. For this reason the page is called composite. Upon the mere rotation of the handle 42 the entire composite page may be changed and for this reason the device simulates a composite book. While there are actually no pages forming the book still the action of the device is the same except for the fact that it is more flexible in that the columns of the different pages may be interchanged or removed or substituted as desired. The advantage of such an arrangement has been clearly described at the front part of this specification.

While I have shown and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:—

1. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization.

2. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, said web units being provided with a supporting surface upon which the exposed web portion rests.

3. A synchronization columnar recording device comprising a body, a plurality of web units adapted to expose sections of webs matched to synchronization, means associated with said body and web units for readily removably holding said web units in columns and lines, and means associated with said body and web units for moving said webs to and fro in synchronization.

4. A synchronization columnar recording device comprising a body, a plurality of web units adapted to expose sections of webs matched to synchronization, means associated with said body and web units for readily removably holding said web units in columns and lines, and means associated with said body and web units for moving said webs to and fro in synchronization, certain of said exposed web sections being arranged parallel to each other and at certain angles to other of said web sections.

5. A synchronization columnar recording device comprising a body, a plurality of web units adapted to expose sections of webs matched to synchronization, means associated with said body and web units for readily removably holding said web units in columns and lines, and means associated with said body and web units for moving said webs to and fro in synchronization, said exposed webs being arranged in a horizontal plane.

6. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, said body comprising a bottom board, a wall surrounding said bottom board, and a removable top plate, said top plate being formed with openings to expose said exposed web sections.

7. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, each of said web units comprising end brackets connected by a top element constituting a support for the exposed portion of a web, upper and lower rollers between said end brackets, and webs mounted upon said upper and lower rollers and extended over said top element.

8. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, each of said web units comprising end brackets connected by a top element constituting a support for the exposed portion of a web, upper and lower rollers between said end brackets for supporting webs extended over said top element, said top element being removably mounted to provide for the changing of the web.

9. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, said means associated with the body and web units for readily removably holding said web units comprising opposed strips attached upon a base board of said body, one of the opposed strips being provided with pegs, and said web units adapted to engage between said opposed strips and having openings for receiving said pegs.

10. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, said means associated with the body and web units for readily removably holding said web units comprising opposed strips attached upon a base board of said body, one of the opposed strips being provided with pegs, and said web units adapted to engage between said opposed strips and having openings for receiving said pegs, said pegs being adjustably mounted.

11. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, comprising an upper and lower drive shaft rotatively mounted and provided with gears, each of said web units being provided with rollers holding the web and gears connected to one of the ends of said rollers, gears of said web units being engageable with the gears upon said shafts, and means for rotating said drive shafts in synchronized relation with said rollers.

12. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, comprising an upper and lower drive shaft rotatively mounted and provided with gears, each of said web units being provided with rollers for holding the web and gears connected to one of the ends of said rollers, gears of said web units being engageable with the gears upon said shafts, and means for rotating said drive shafts in synchronized relation with said rollers, including drums upon the drive shafts, and a tape wound upon said drums uniformly attached and arranged as to number of turns and diameters as the webs upon the rollers.

13. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, comprising an upper and lower drive shaft rotatively mounted and provided with gears, each of said web units being provided with rollers for holding the web and gears connected to one of the ends of said rollers, gears of said web units being engageable with the gears upon said shafts, and means for rotating said drive shafts in synchronized relation with said rollers, said drive shafts being provided with gears, a vertical shaft slidably mounted and having a gear engageable with one of said latter mentioned gears and movable to a neutral position and to another position engageable with the other of said gears.

14. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, said means associated with the body and web units for readily removably holding said web units comprising opposed strips attached upon a base board of said body, one of the opposed strips being provided with pegs, and said web units adapted to engage between said opposed strips and having openings for receiving said pegs, said web units being of different widths and each arranged with matched rollers and all of said web units being synchronized for exposing the same sections relative to each other for each position.

15. A device for forming composite sheet-like pages comprising a body, a plurality of web units adapted to expose sections of webs matched to synchronization, means associated with said body and web units for readily removably holding said web units, and means associated with said body and web units for moving said webs to and fro in synchronization, said means associated with the body and web units for readily removably holding said web units comprising opposed strips attached upon a base board of said body, one of the opposed strips being provided with pegs, and said web units adapted to engage between said opposed strips and having openings for receiving said pegs, said web units being of different widths and each arranged with matched rollers synchronized with each other, the rollers of the small web units being of small diameter and the other rollers of a larger web unit being correspondingly larger so as to produce a synchronized device.

CHESTER C. KASKELL.